(12) United States Patent
Subr et al.

(10) Patent No.: US 9,741,153 B2
(45) Date of Patent: Aug. 22, 2017

(54) COMBINING SAMPLING ARRANGEMENTS AND DISTRIBUTIONS FOR STOCHASTIC INTEGRATION IN RENDERING

(71) Applicant: Disney Enterprises, Inc., Burbank (CA)

(72) Inventors: Kartic Subr, Edinburgh (GB); Kenneth Mitchell, Earlston (GB); Wojciech Jarosz, Zurich (CH); Derek Nowrouzezahrai, Quebec (CA)

(73) Assignee: Disney Enterprises, Inc., Burbank, CA (US)

( * ) Notice: Subject to any disclaimer, the term of this patent is extended or adjusted under 35 U.S.C. 154(b) by 166 days.

(21) Appl. No.: 14/663,693

(22) Filed: Mar. 20, 2015

(65) Prior Publication Data

US 2016/0275718 A1 Sep. 22, 2016

(51) Int. Cl.
*G06T 15/50* (2011.01)
*G06T 15/00* (2011.01)

(52) U.S. Cl.
CPC .................. *G06T 15/00* (2013.01)

(58) Field of Classification Search
None
See application file for complete search history.

(56) References Cited

U.S. PATENT DOCUMENTS

| | | | | |
|---|---|---|---|---|
| 6,381,586 B1 * | 4/2002 | Glasserman | ............ | G06F 17/18 705/35 |
| 6,772,136 B2 * | 8/2004 | Kant | .......... | G06F 8/10 705/35 |
| 7,091,973 B1 * | 8/2006 | Cohen | .......... | G06T 15/50 345/426 |
| 2006/0074611 A1 * | 4/2006 | Wong | .......... | G03F 7/70633 703/2 |
| 2010/0312530 A1 * | 12/2010 | Capriotti | .......... | G06F 17/5018 703/2 |

OTHER PUBLICATIONS

Ohbuchi, R., Aono, M., Quasi-Monte Carlo Rendering with Adaptive Sampling, Jun. 1996, IBM Tokyo Research Laboratory, pp. 1-13.*

(Continued)

*Primary Examiner* — Said Broome
(74) *Attorney, Agent, or Firm* — Patterson + Sheridan, LLP

(57) ABSTRACT

Systems, methods and articles of manufacture for sampling visual characteristics of a three-dimensional scene. Embodiments include collecting a plurality of samples within the three-dimensional scene. Upon determining that a combined stratified importance sampling algorithm will result in reduced error for a rendered image of the three-dimensional scene, embodiments collect the plurality of samples using the combined stratified importance sampling algorithm, and otherwise the plurality of samples are collected using a stratified sampling algorithm. The combined stratified importance sampling algorithm integrates an antithetic sampling algorithm. One or more lighting effects for the three-dimensional scene are simulated based on the plurality of samples and data describing one or more light sources for the three-dimensional scene. Embodiments further include rendering the image based on the simulated one or more lighting effects and data describing characteristics of the three-dimensional scene.

20 Claims, 5 Drawing Sheets

(56) References Cited

OTHER PUBLICATIONS

Agarwal et al., "Structured Importance Sampling of Environment Maps", 2003 ACM Transactions on Graphics vol. 22, No. 3, pp. 605-612.
Bishop, C.M., "Pattern Recognition and Machine Learning", © 2006 Springer Science+Business Media, LLC, 84 pages.
Clarberg, P. et al., "Wavelet Importance Sampling: Efficiently Evaluating Products of Complex Functions", 2005 ACM Transactions on Graphics, vol. 5, No. 1 (Jan.), 10 pages.
Cook, R. L., "Stochastic Sampling in Computer Graphics", ACM Transactions on Graphics, vol. 5, No. 1, Jan. 1986, pp. 51-72.
Georgiev, I. et al., "Joint Importance Sampling of Low-Order Volumetric Scattering", 2013 ACM Transactions on Graphics, vol. 32, No. 6, Nov. 2013, 14 pages.
Haber, S., "Numerical Evaluation of Multiple Integrals", 1970 SIAM Review, vol. 12, pp. 481-526, (abstract only).
Hammersley, J.M. et al., "General Principles of Antithetic Variates", 1956 Mathematical Proceedings of the Cambridge Philosophical Society, vol. 52, Issue 03, pp. 476-481, (abstract only).
Hammersley, J.M. et al., "A New Monte Carlo Technique: Antithetic Variates", 1956 Mathematical Proceedings of the Cambridge Philosophical Society, vol. 52, Issue 03, pp. 449-475, (abstract only).
Hesterberg, T.C., "Advances in Importance Sampling", PhD thesis, Stanford University, version created Jun. 29, 2003, 192 pages.
Jakob, W. © 2010 Mitsuba Renderer, <http://www.mitsuba-renderer.org>.
Kajiya, J.T., "The Rendering Equation", 1986 SIGGRAPH Comput. Graph. vol. 20, No. 4, pp. 143-150.
Keller, A. et al., "Monte Carlo and Quasi-Monte Carlo Methods 2006", © 2008 Springer-Verlag Berlin Heidelberg, (abstract only).
Keller, A. et al., Advanced (Quasi) Monte Carlo Methods for Image Synthesis, ACM SIGGRAPH 2012 Courses, 21:1-21:46 (abstract only).
Keller, A., "Quasi-Monte Carlo Methods in Computer Graphics: The Global Illumination Problem", 1996 Lectures in Applied Mathematics, 15 pages.
Krivanek, J. et al., "Real-time Shading with Filtered Importance Sampling", 2008 Eurographics Symposium on Rendering, vol. 27, No. 4, pp. 1147-1154.
Lawrence, J. et al., "Efficient BRDF Importance Sampling Using a Factored Representation", 2004 ACM Transactions on Graphics, pp. 496-505.
Lemieux, C., "Monte Carlo and Quasi-Monte Carlo Sampling", 2010 Springer Series in Statistics, 381 pages.
McKay, M.D. et al., "A Comparison of Three Methods for Selecting Values of Input Variables in the Analysis of Output from a Computer Code", Feb. 2000 Technometrics, vol. 42, No. 1, Special 40th Anniversary Issue, pp. 55-61, published by: American Statistical Association and American Society for Quality © 1979.
Mitchell, D.P., "Consequences of Stratified Sampling in Graphics", 1996 SIGGRAPH, pp. 277-280, (abstract only).
Morokoff, W.J. et al., "Quasi-Monte Carlo Integration", Dec. 1995 Journal of Computational Physics, vol. 122, Issue 2, pp. 218-230, (abstract only).
Nelsen, R. B., "An Introduction to Copulas", 2006 Springer Series in Statistics, (abstract only).
Neyman, J., "On the Two Different Aspects of the Representative Method: The Method of Stratified Sampling and the Method of Purposive Selection", Jun. 19, 1934, Journal of the Royal Statistical Society, vol. 97, No. 4, pp. 558-625, published by: Blackwell Publishing for the Royal Statistical Society.
Niederreiter, H., "Random Number Generation and Quasi-Monte Carlo Methods", 1992 Society for Industrial and Applied Mathematics, 243 pages, (part 1 of 2).
Niederreiter, H., "Random Number Generation and Quasi-Monte Carlo Methods", 1992 Society for Industrial and Applied Mathematics, 243 pages, (part 2 of 2).
Owen, A., et al., "Safe and Effective Importance Sampling", 2000 Journal of the American Statistical Association, vol. 95, Issue 49, pp. 135-143, (abstract only).
Owen, A., "Local Antithetic Sampling With Scrambled Nets", 2008 The Annals of Statistics, vol. 36, No. 5, pp. 2319-2343.
Owen, A., "Monte Carlo theory, methods and examples", 2013, to be published, <http://statweb.stanford.edu/~owen/mc/>.
Pharr, M. et al., "Physically Based Rendering, Second Edition: From Theory to Implementation", 2010, Morgan Kaufmann Publishers, Inc., (abstract only).
Ramamoorthi, R. et al., "A Theory of Monte Carlo Visibility Sampling", Aug. 2012 ACM Transactions on Graphics, vol. 31, No. 5, Article 121, pp. 121:1-121:16.
Saliby, E. et al., "A Farewell to the Use of Antithetic Variates in Monte Carlo Simulation", 2009 Journal of the Operational Research Society, vol. 60, No. 7, pp. 1026-1035, (abstract only).
Saliby, E., "Descriptive Sampling: An Improvement Over Latin Hypercube Sampling", 1997 Winter Simulation Conference, pp. 230-233.
Schweizer, B. et al., "Probabilistic Metric Spaces", 1983 North-Holland Series in Probability and Applied Mathematics, 38 pages.
Shirley, P., "Discrepancy as a Quality Measure for Sampling Distributions", Jun. 1991 Proceedings of Eurographics, pp. 183-193.
Subr, K. et al., "Fourier Analysis of Stochastic Sampling Strategies for Assessing Bias and Variance in Integration", Jul. 2013 ACM Transactions on Graphics, vol. 32, Isssue 4, Article No. 28, pp. 128:1-128:12.
Veach, E. et al., "Optimally Combining Sampling Techniques for Monte Carlo Rendering", 1995 Proceedings of the 22nd Annual Conference on Computer Graphics and Interactive Techniques, SIGGRAPH '95, pp. 419-428.
Veach, E., "Robust Monte Carlo Methods for Light Transport Simulation", Dec. 1997, PhD thesis, Stanford University, 432 pages.
Subr, K. et al., "A Theoretical Analysis of Combining Sampling Arrangements and Distributions for Stochastic Integration in Rendering", paper submission for SIGGRAPH 2014, 10 pages.

\* cited by examiner

COMBINING SAMPLING ARRANGEMENTS AND DISTRIBUTIONS FOR STOCHASTIC INTEGRATION IN RENDERING

BACKGROUND

Field of the Invention

The present disclosure related to the field of computer graphics, and in particular to techniques for integrating stochastic sampling strategies when estimating lighting for a virtual environment Description of the Related Art Many computer graphic images are created by mathematically modeling the interaction of light with a three dimensional scene from a given viewpoint. This process, called rendering, generates a two-dimensional image of the three dimensional scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Typically, rendering effects are performed by sampling a three-dimensional scene at discrete points. The renderer determines one or more attribute values, such as color, transparency, or depth, for the sample of the three-dimensional scene. The attribute values of one or more samples of the three-dimensional scene are then combined to determine the value of a pixel of the rendered image. For example, a renderer may trace sample rays into a three-dimensional scene (or project geometry on to an image plane) to render geometry. The intersection of a sampling ray and geometry (or an image sample point in the image plane and the projected geometry) defines a sample of the three-dimensional scene used to determine the value of a pixel of the rendered image. Additionally, illumination, shadowing, scattering, depth of field, motion blur, reflection, and refraction effects are created by casting additional sample rays from an intersected portion of scene geometry into further portions of the three-dimensional scene.

Many visual effects may require multiple samples of the scene data for each image pixel to be effective. For example, reflection effects may require tens or even hundreds of samples to achieve visually accurate results. Undersampling, or using too few samples, can result in unwanted visual artifacts such as aliasing and low detail. However, sampling a three-dimensional scene through ray tracing or other techniques is time consuming and computationally expensive. Thus, reducing the number of samples required by a renderer to produce an accurate and aesthetically-pleasing image can produce enormous gains in performance.

As discussed above, when rendering a scene, lighting effects can be considered at each sampled point of the three dimensional scene. As part of determining lighting characteristics of a point or points on a surface, shadowing effects can also be considered. For instance, a determination can be made as to whether each light source in the object scene contributes to the computed color value of the pixel. This entails identifying whether the light emitted from each light source is transmitted unoccluded to the given point on the surface or whether the light is blocked by some other element of the object scene, i.e., whether the given point is shadowed by another object. Note that a light source may be any type of modeled light source or other source of illumination, such as the reflective surface of an object.

SUMMARY

One embodiment provides a method of rendering an image representing a three-dimensional scene. The method includes collecting a plurality of samples within the three-dimensional scene. Upon determining that a combined stratified importance sampling algorithm will result in reduced error for a rendered image of the three-dimensional scene, the method includes collecting the plurality of samples using the combined stratified importance sampling algorithm, and otherwise includes collecting the plurality of samples using a stratified sampling algorithm. The combined stratified importance sampling algorithm integrates an antithetic sampling algorithm. Additionally, the method includes simulating one or more lighting effects for the three-dimensional scene, based on the plurality of samples and data describing one or more light sources for the three-dimensional scene. The method further include rendering, by operation of one or more computer processors, the image based on the simulated one or more lighting effects and data describing characteristics of the three-dimensional scene.

Other embodiments provide a non-transitory computer-readable medium and a system containing computer program code adapted to carry out the aforementioned method when executed.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
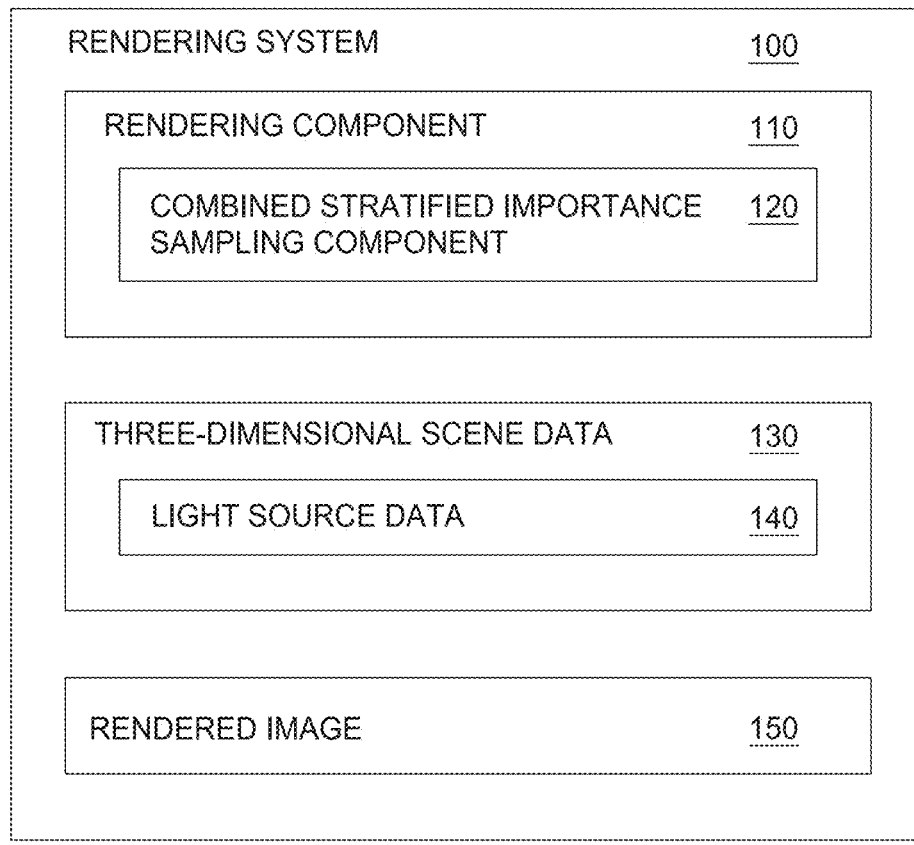
FIG. 1 is a block diagram illustrating a system configured with a combined stratified importance sampling component, according to one embodiment described herein.

Estimating lighting in a virtual environment is a complex operation which requires a numerical solution to a multidimensional integration problem. While techniques have been developed to reduce the complexity of lighting operations, such techniques may introduce some degree of error into the calculation. Moreover, any degree error in the integral estimation can manifest as visually unpleasant artifacts in the rendered images.

Generally, stochastic sampling strategies can be employed to reduce this error. However, some stochastic sampling strategies, such as importance sampling and multiple importance sampling, are known to only reduce the error of naive Monte Carlo by a constant amount. Other stochastic sampling strategies, such as jittered sampling, affect the convergence rate, i.e., the rate at which the error vanishes.

Numerical integration typically involves three steps. First, a set of points (or sample locations) are chosen in the integration domain. Next, the integrand is evaluated at these sampled locations. The final integral estimate is obtained by averaging these evaluated values. Generally speaking, different sampling strategies result in different estimators.

Typically, for any given sampling strategy, increasing the number of sampling points (or locations) results in a lower error. Put simply, the choice of sampling strategy affects the magnitude of this error and the rate at which the error is reduced as the number of samples increases (i.e., the convergence rate). In computer graphics, the problem of synthesizing computer generated images hinges around simulating the propagation of light energy in a virtually described environment. This light transport problem is reducible to a high-dimensional integration problem, which may be solved using Monte Carlo (MC) integration. Errors in this integration generally manifest either as structured artifacts or stochastic noise in the computer generated image, and various strategies can be employed to reduce this error.

For instance, the distribution could be tailored to particular samples within the three dimensional scene (e.g. importance sampling). This strategy can provide considerable error reduction when components of the integrand are not smooth and such behavior is known a priori. However, the reduction provided by this class of methods does not increase with sampling size. That is, importance sampling (IS) does not affect the convergence rate.

A second class of sampling techniques imposes positional constraints, such as the partitioning constraints of stratified sampling or the minimum separation constraints of Poisson-disk and Halton sampling. One advantage to these methods is their ability to improve the convergence rate.

In some instances, importance sampling can be combined with positional constraint sampling in order to improve the quality of rendered images in many cases. Embodiments provide equations for variance of jittered importance sampling and jittered multiple importance sampling (MIS) which reveal counter-intuitive results such as the possibility of increasing estimator variance by stratifying MIS. The practical application of stratified sampling in statistics fundamentally differs from jittered sampling used in graphics. In rendering, the importance function is typically known globally over the domain, the domain is often partitioned into equal-measure strata and sampled with equal allocation (jittered sampling). Embodiments provide an estimator that combines stochastic jitter, antithetic sampling and importance sampling over the entire domain.

Antithetic sampling is a classical strategy in the statistics literature that reduces error by generating samples that are inversely correlated with each other. Although it boasts the ability to produce zero-error estimates for special cases (e.g., linear and skew-symmetric integrands), such a sampling technique is no longer heavily applied for two primary reasons. First, antithetic sampling can increase error for complex integrands, and it is not as easy to manipulate as importance sampling in these cases. In addition, antithetic sampling only provides a constant error-reduction and does not impact the convergence rate. However, embodiments analyze the combination of jittered sampling (improves convergence) with importance sampling (reduces error by a constant).

Embodiments provide techniques for combining importance (and multiple-importance sampling) with other sampling techniques such as jittered sampling techniques. Generally, while importance and multiple-importance sampling are known to reduce the error of naïve Monte Carlo sampling by a constant amount, other sampling techniques such as jittered sampling can affect the convergence rate of error (i.e., the rate at which the error vanishes). Additionally, some embodiments apply classical variance reduction tools such as antithetic sampling to the rendering problem in order to further improve the results. Like importance sampling, antithetic sampling is generally known to provide at best a constant error reduction, without affecting the convergence rate. While both importance and antithetic sampling only provide a constant error reduction independently, by integrating these techniques together embodiments can provide a statistically significant improvement in the convergence rate when combined with jittered sampling.

One embodiment provides techniques for rendering images of a three-dimensional scene using jittered antithetic importance sampling. For instance, embodiments include sampling a plurality of points within the three-dimensional scene using a combined stratified importance sampling algorithm. In one embodiment, importance sampling is addressed with a Fourier analysis and an upper bound for its variance. Additionally, embodiments may derive a second-order condition that predicts variance increase in antithetic sampling. Also, particular embodiments use Gaussian copulas to generate generalized antithetic variables in arbitrary dimensions. Once the plurality of points are sampled, embodiments simulate one or more lighting effects for the three-dimensional scene, based on the sampled plurality of points and data describing one or more light sources for the three-dimensional scene. Embodiments further render the image of the three-dimensional scene based on the simulated one or more lighting effects.

In a particular embodiment, exact error equations are derived in stratified sampling for jittered importance sampling and jittered multiple-importance sampling. In such an embodiment, insights revealed through these analyses are collected for use in constructing a new jittered antithetic importance sampling estimator. This estimator can then be applied to realistic image synthesis and assess its impact and potential drawbacks. For example, in one embodiment, multiple-importance sampling is used to sample from two distributions, such as lighting and bidirectional reflectance distribution functions (BRDF), producing lower error than importance sampling with their averaged probability density functions (PDFs).

RenderMan®, a registered trademark of Pixar (Emeryville, Calif.), is the name of a rendering software package. RenderMan specifies a widely used interface, also created by Pixar, that stands between modeling programs and rendering programs. The RenderMan Interface is a three-dimensional scene description interface and is used for describing three-dimensional scenes in a manner suitable for photorealistic image synthesis.

The RenderMan® environment provides the RenderMan Shading Language, which is a programming language designed to be used with the RenderMan Interface and to extend its predefined functionality. Generally, shading includes the entire process of computing the color of a point on a surface or at a pixel. The shading process typically requires the specification of light sources, surface material properties, volume or atmospheric effects, and pixel operations. Each part of the shading process is controlled by giving a function that mathematically describes that part of the shading process.

The term shader refers to a procedure that implements one of these processes, and the specification sets forth the following five major types of shaders: light source shaders, surface shaders, volume shaders, displacement shaders and imager shaders. With respect to light shaders, lights may exist alone or be attached to geometric primitives. Generally, a light source shader calculates the color of the light emitted from a point on the light source towards a point on the surface being illuminated. A light will typically have a color or spectrum, an intensity, a directional dependency and a fall-off with distance.

Surface shaders may be attached to all geometric primitives within a three-dimensional scene and can be used to model the optical properties of materials from which the primitive was constructed. For instance, a surface shader may compute the light reflected in a particular direction by summing over the incoming light and considering the properties of the surface. Volume shaders, on the other hand, modulate the color of a light ray as it travels through a volume, where a volume is defined as the inside of a solid object within the three-dimensional scene. The atmosphere is the initial volume defined before any objects are created.

Displacement shaders are generally used to create bumps on surfaces within the three-dimensional scene by changing the position and normals of points on the surface. Additionally, imager shaders are used to program pixel operations that are performed before the image is quantized and output. Within the RenderMan interface, a number of standard shaders are defined, as represented by Table 1 shown below.

TABLE 1

RenderMan Interface Standard Shaders

| Type | Shader(s) |
| --- | --- |
| Light sources | ambientlight, distantlight, pointlight, spotlight |
| Surfaces | constant, matte, metal, shinymetal, plastic, paintedplastic |
| Volume (atmosphere) | fog, depthcue |
| Displacement | bumpy |
| Imager | background |

FIG. 1 is a block diagram illustrating a system configured with a combined stratified importance sampling component, according to one embodiment described herein. As shown, the system 100 includes a rendering component 110, three-dimensional scene data 130 and a rendered image 150. The rendering component 110 includes a combined stratified importance sampling component 120. The three-dimensional scene data 130 generally describes characteristics of a three-dimensional scene, and such characteristics may include scene geometry, viewpoint information, texture information, and shading information. Additionally, the three-dimensional scene data 130 includes light source data 140 that describes characteristics of light sources within the three-dimensional scene (e.g., a color of the light source, position of the light source, orientation of the light source, a measure of brightness of the light source, and so on).

Generally, the rendering component 110 is configured to generate the rendered image 150 from the three-dimensional scene data 130, based on a particular viewpoint within the three-dimensional scene. In generating the rendered image, the rendering component 110 can take into account various elements of the three-dimensional scene, such as the geometry information, texture information, shading information and so on specified by the three-dimensional scene data 130.

Additionally, the rendering component 110 can consider the light source information 140 in rendering the image 150. In doing so, the rendering component 110 may solve a rendering equation that simulates lighting phenomena within the three-dimensional scene represented by the three-dimensional scene data 130. In rendering the image 150, the combined stratified importance sampling component 120 can be configured to sample images or light rays from the three-dimensional scene. Generally, a number of different sampling approaches and different numbers of samples can be used, with the different approaches and numbers of samples affecting the quality of the rendered image and the processing time required to sample the three-dimensional scene. Moreover, particular sampling approaches may result in a high quality rendered image but may require additional knowledge about the three-dimensional scene (e.g., details about the scene's geometry, the scene's optimal sampling density function, etc.).

As such, embodiments provide techniques for rendering an image representing a three-dimensional scene. As part of such a rendering process, the combined stratified importance sampling component 120 collects a plurality of samples within the three-dimensional scene using a combined stratified importance sampling algorithm. As discussed above, while sampling approaches such as importance sampling and multiple-importance sampling are known to reduce the error by a constant amount, other sampling techniques such as jittered sampling can affect the convergence rate of error. Additionally, antithetic sampling is generally known to provide a constant error reduction. As will be discussed in more detail below, the combined stratified importance sampling component 120 is configured to collect a plurality of samples within the three-dimensional scene using a sampling algorithm which combines multiple existing sampling techniques in order to minimize error the resulting rendered image 150. For example, the combined stratified importance sampling component 120 could be configured to integrate importance sampling, antithetic sampling and jittered sampling techniques together to achieve a statistically significant improvement in the convergence rate of error.

Once the samples are collected, the rendering component 110 can simulating one or more lighting effects for the three-dimensional scene, based on the plurality of samples and data describing one or more light sources for the three-dimensional scene. In doing so, the rendering component 110 can make use of one or more shaders. The rendering component 110 then renders the image 150 based at least in part on the simulated one or more lighting effects and the three-dimensional scene data 130. For example, the rendering component 110 could also consider scene data such as scene geometry, viewpoint information, texture information, and shading information in producing the rendered image 150 of the three-dimensional scene. Doing so provides an improved technique for estimating lighting effects in a virtual environment.

Figure 2:
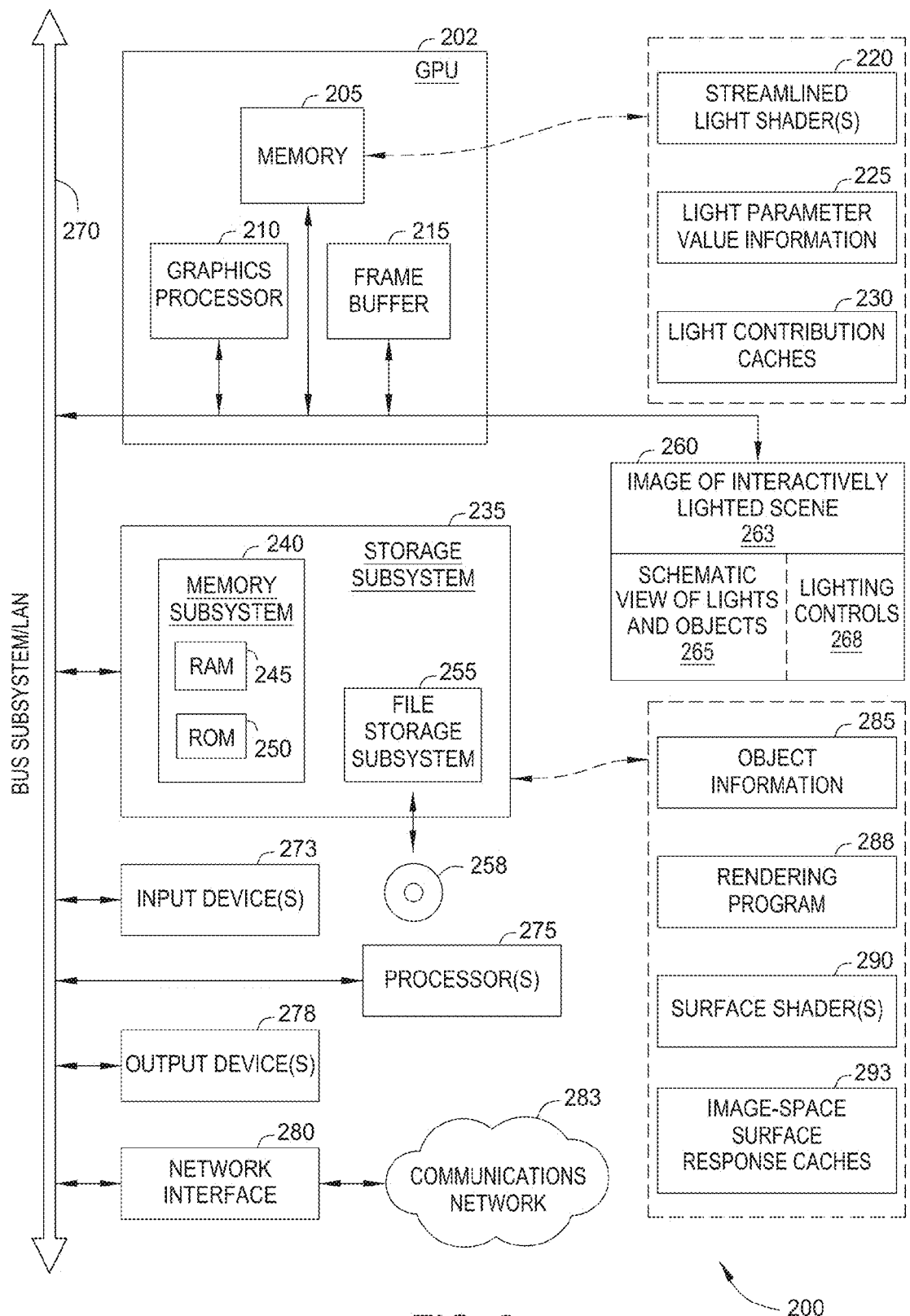
FIG. 2 is a high-level schematic of a rendering system configured with a combined stratified importance sampling component, according to one embodiment described herein.

FIG. 2 is a high-level schematic of a rendering system 200 incorporating an embodiment described herein. System 200 may be a personal computer, video game console, personal digital assistant, rendering engine, or any other device suitable for practicing one or more embodiments of the present invention. Ata high level, the system can be considered to include the elements of a general purpose computer system, augmented by a specialized graphics processing unit (GPU) 202. As will be discussed in detail below, the illustrated general purpose computer, or another computer, is used in rendering images of a three-dimensional scene using jittered antithetic importance sampling. The illustrated general purpose computer is also used to provide a computing environment for GPU 202.

The general purpose computer 200 depicted in FIG. 2 typically includes at least one processor 275, which communicates with a number of peripheral devices (including GPU 202) via a bus subsystem 270. These peripheral devices typically include a storage subsystem 235, comprising a memory subsystem 240 and a file storage subsystem 255, user interface input devices 273, user interface output devices 278, a separately denoted display 260 (which may comprise multiple displays), and a network interface subsystem 280.

Bus subsystem 270 provides a mechanism by which the various components and subsystems of computer system 200 communicate with each other to effect the intended operations. The various subsystems and components of system 200 need not be at the same physical location but may be distributed at various locations on a local area network (LAN). Although bus subsystem 270 is shown schematically as a single bus, embodiments of the bus subsystem may utilize multiple buses.

The input devices 273 and output devices 278 allow user interaction with system 200. Although the user of the rendering system is contemplated to be a human user, some of the input and output devices may be suitable for interaction with other than a human user (e.g., a device, a process, another computer). Network interface subsystem 280 provides an interface to one or more networks, including an interface to a communications network 283, and is connected via such networks to corresponding interface devices in other computer systems. The network interface 280 may include, for example, a modem, an Integrated Digital Services Network (ISDN) device, an Asynchronous Transfer Mode (ATM) device, a Direct Subscriber Line (DSL) device, a fiber optic device, an Ethernet card, a cable TV device, or a wireless device. The communications network 283 may be representative of local area networks, wide area networks, or a collection of networks such as the internet.

Input devices 273 may include a keyboard, pointing devices such as a mouse, trackball, touchpad, or graphics tablet, a scanner, a barcode scanner, a touchscreen incorporated into display 260, audio input devices such as voice recognition systems, microphones, and other types of input devices. In general, use of the term "input device" is intended to include all possible types of devices and ways to input information into system 200 or onto communications network 283.

Output devices 278 may include one or more printers, fax machines, or non-visual displays such as audio output devices. Display 260 may be a cathode ray tube (CRT), a flat-panel device such as a liquid crystal display (LCD) or a plasma display, or a projection device. In general, use of the term "output device" is intended to include all possible types of devices and ways to output information from system 200 to a user or to another machine or computer system.

Storage subsystem 235 stores the basic programming and data constructs that provide the functionality of the relighting system. For example, the various program modules and databases implementing the functionality of the present invention may be stored in storage subsystem 235. These software modules are generally executed by processor(s) 275, although as will be described below, some software is executed by GPU 202. In a distributed environment, the software modules may be stored on a plurality of computer systems and executed by processors of the plurality of computer systems.

Memory subsystem 240 typically includes a number of memories including a main random access memory (RAM) 245 for storage of instructions and data during program execution and a read only memory (ROM) 250 in which fixed instructions are stored. File storage subsystem 255 provides persistent (non-volatile) storage for program and data files, and may include one or more hard disk drives and one or more drives for reading and writing removable media, typically along with their associated removable media (shown symbolically as a disk 258). Removable media include, for example, removable magnetic media (e.g., floppy disks, or larger capacity flexible or rigid media such as those marketed under the ZIP and REV registered trademarks by omega Corporation), and optical media (e.g., CD-ROM, CD-R, CD-RW, DVD-ROM, DVD-RAM, DVD-R, DVD-RW). One or more of the drives may be located at remote locations on other connected computers on the LAN or at another site on communications network 70, and may be shared by multiple computers.

The general purpose computer incorporated in system 200 can be of any type capable of performing the functions in an acceptable manner. Examples of such possible computers include a personal computer (desktop or laptop), a workstation, a computer terminal, a network computer, a mainframe, or any other data processing system. Due to the ever-changing nature of computers and networks, the description of the computer system 200 depicted in FIG. 2 is intended only as a specific example for purposes of illustrating a representative configuration.

GPU 202 includes a graphics processor 210, a memory subsystem 205, and one or more frame buffers 215. Graphics processor 210 may be a specially configured processor adapted for performing 3-D graphics processing operations at an accelerated rate. Generally, GPUs are available from a number of manufacturers, including NVIDIA® and ATI®.

Some of the salient features of system 200 reside in the programs and data structures shown in storage subsystem 235 and GPU memory 205. For instance, a cache-generating shader could be executed by a conventional software renderer, and a cache-reading shader could be executed on the GPU. For instance, the cache-generating shader could be represented at a high level by storage subsystem 235 storing object information 285, a rendering program 288 (e.g., the RenderMan® program), and surface shaders 290, which together are used to generate image-space surface response caches (Ipics caches) 293. These caches may store surface geometry and associated parameters that serve as inputs to an illumination model. Additionally, a cache-reading shader could be executed on the CPU 202, such that GPU memory 205 could store streamlined light shaders 220 with associated lighting parameter values 225 for the individual lights. These shaders, when executed by graphics processor 210, using the data stored in caches 293 as operands, can generate results for each light's contribution to the overall lighting, which are stored as light contribution caches 230.

Generally, the rendering program 288 could be configured with a combined stratified importance sampling component 120 that collects a plurality of samples within the three-dimensional scene using a combined stratified importance sampling algorithm. The rendering program 288 (or the streamlined light shader(s) 220) could then simulate one or more lighting effects, based on the collected plurality of samples. The rendering program 288 could then render an image of the three-dimensional scene, based on the lighting effects and data describing characteristics of the three-dimensional scene. Doing so reduces a convergence rate of error in the resulting image through the use of the combined stratified importance sampling algorithm.

Additionally, display 260 is shown, in an exemplary embodiment, as displaying three distinct regions, an image of an interactively lighted scene 263, a schematic view of the lights and objects 265, and a set of light controls (control panel) to allow the user to specify values for the lighting parameters 268. It will be understood that the schematic view of the lights and the control panel are merely one example of a set of tools for users. While a graphical user interface is generally preferred, the system could include a command-line interface as well as, or instead of, the graphical interface.

Figure 3:
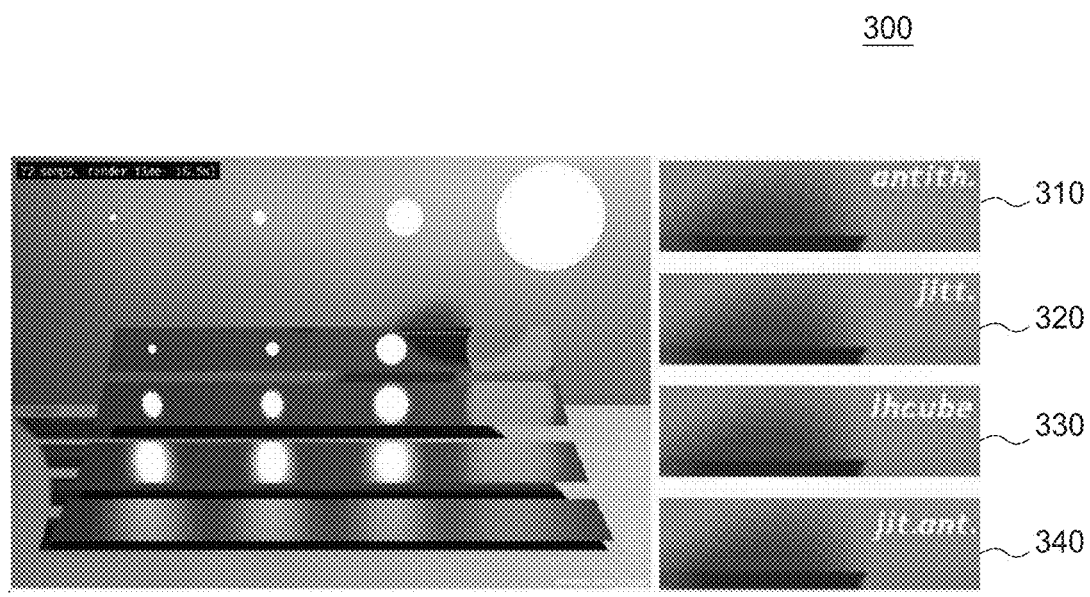
FIG. 3 is a screenshot illustrating insets from a three-dimensional scene rendered using different sampling strategies, according to one embodiment described herein.

FIG. 3 is a screenshot illustrating insets from a three-dimensional scene rendered using different sampling strategies, according to one embodiment described herein. As shown, the screenshot 300 includes inset 310 rendered using antithetic sampling, inset 320 rendered using jittered sampling, inset 330 rendered using latin hypercube (lhcube) sampling and inset 340 rendered using jittered antithetic sampling. As can be seen in FIG. 3, particular insets (e.g., inset 310) contain unpleasant visual noise as a result of the manifestation of error resulting from the use of solely antithetic sampling. In contrast, the inset 340 contains significantly less visual noise, as a result of less error due to the use of jittered antithetic sampling. Here, the combined stratified importance sampling component 120 has used a combined stratified importance sampling algorithm to render the inset 340. More specifically, by combining stratification (i.e., via jittered sampling) with antithetic sampling, the combined stratified importance sampling component 120 can reduce the error (i.e., visible noise) within the rendered image. Moreover, the combined stratified importance sampling component 120 further reduces the convergence rate of error in the rendered image by integrating jittered sampling techniques together with antithetic sampling techniques.

Figure 4:
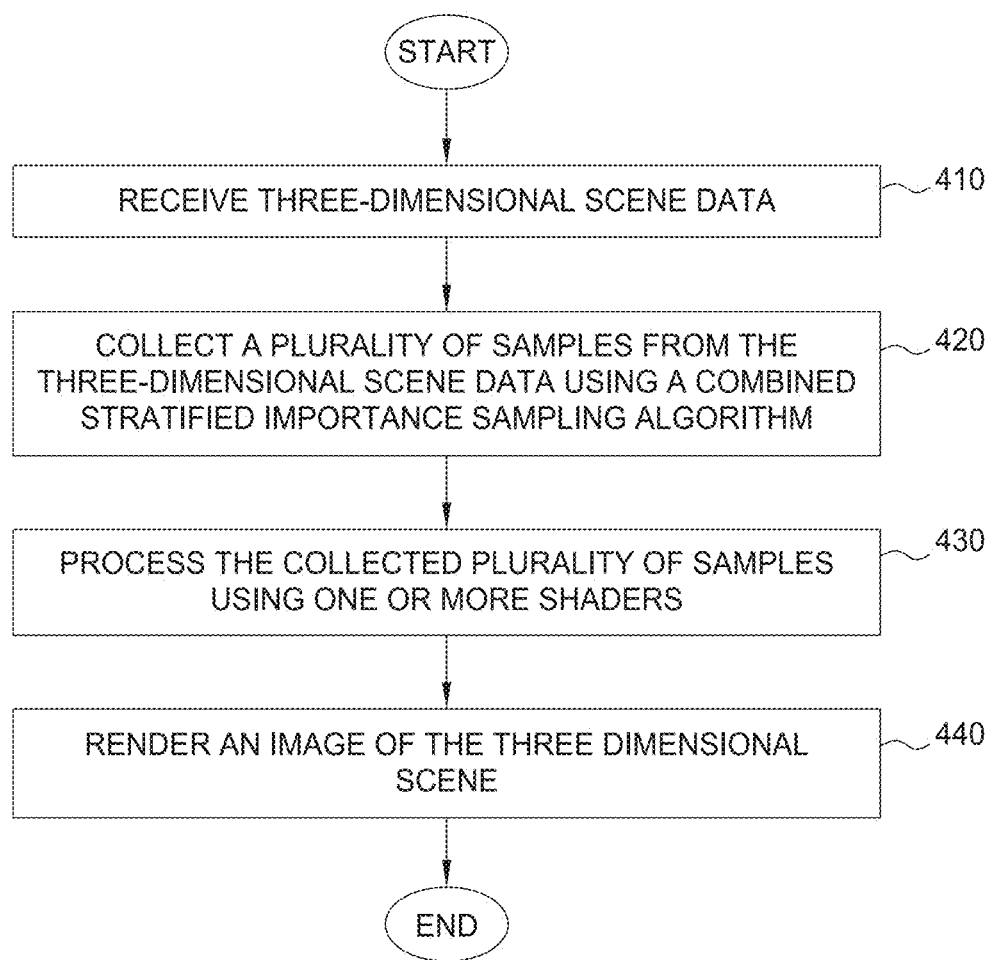
FIG. 4 is a flow diagram illustrating a method of rendering an image from a three-dimensional scene through the use of a combined stratified importance sampling algorithm, according to one embodiment described herein.

FIG. 4 is a flow diagram illustrating a method of rendering an image from a three-dimensional scene through the use of a combined stratified importance sampling algorithm, according to one embodiment described herein. As shown, the method 400 begins at block 410, where the combined stratified importance sampling component 120 receives three-dimensional scene data describing characteristics of a three-dimensional scene. For instance, the scene data can specify geometric objects within the scene, texture information for the scene, lighting information for the scene, and so on. Generally, the three-dimensional scene data represents any data describing the scene and can be formatted according to any suitable format.

The combined stratified importance sampling component 120 then collects a plurality of samples from the three-dimensional scene using a combined stratified importance sampling algorithm (block 420). Once the combined stratified importance sampling component 120, a rendering component processes the collected plurality of samples using one or more shaders (block 430) and renders an image of the three-dimensional scene (block 440), at which point the method 400 ends.

In the following description, Monte Carlo estimators are analyzed for the multidimensional integral $I=\int_D f(x)dx$, $x \in \mathcal{D}$. Additionally, $\tilde{\mu}$ denotes an estimator for I along with a suffix to identify the sampling strategy and sample count. For instance, a primary Monte Carlo estimator for I could be $\tilde{\mu}_1=f(X)$, $X \in \mathcal{D}$, which is an unbiased estimator where X is distributed uniformly. Moreover, random variables are capitalized (e.g., X, $Y_i$, etc.).

In one embodiment, the combined stratified importance sampling component 120 is configured to use a multiple importance sampling algorithm, where the primary importance sampling estimator is $\tilde{\mu}_{is,1}=f(X)/g(X)$, $X \sim g(x)$ and the corresponding second estimator is $$\tilde{\mu}_{is,N} = \frac{1}{N}\Sigma f(X_i)/g(X_i),\ X_i \sim g(x).$$

Generally, the extent of variance reduction from importance sampling depends critically on the choice of estimators used, and these estimators are advantageous as both estimators are unbiased.

As discussed above, the combined stratified importance sampling component 120 is configured to integrate stratified sampling techniques together with importance sampling techniques. One example of such a stratified sampling algorithm is jittered sampling. Generally, stratified sampling operates by partitioning the integration domain D into mutually exclusive subdomains $D_j$ so that $\mathcal{D} = \cup_{j=1}^{M} \mathcal{D}_j$, $j=1, 2, \ldots, M$ and $\cap_{j=1}^{M} \mathcal{D}_j = \emptyset$. The estimator for I may be obtained from the sum of the estimates of integrals in each of the domains. In jittered sampling, the subdomains are of equal area and a single random sample is used within each stratum; e.g., $\tilde{\mu}_{js,M}=\Sigma f(X_j)/M$, $X_j \in \mathcal{D}_j$, where $f(X_j)$ are primary estimates within the strata.

In one embodiment, the combined stratified importance sampling component 120 is configured to combine stratified sampling with multiple importance sampling. Generally, in multiple importance sampling, the integrand is the product of two or more terms. Rather than sampling the product, multiple importance sampling samples from the average of the distributions. When samples for numerical integration are distributed non-uniformly in the domain, the can be weighted by the reciprocal of the normalized probability density to yield unbiased results.

In one embodiment, the combined stratified importance sampling component 120 is configured to integrate antithetic sampling techniques together with stratified sampling and importance sampling algorithms. Antithetic sampling generally yields a zero variance estimator when the samples are perfectly inversely correlated and the integrand is either linear or skew symmetric (about the center of the domain). While such scenarios are rare in rendering, where the integrand is often a discontinuous (e.g., due to visibility, texture, etc.) superposition of all-frequency functions (e.g., lighting, reflectance, texture, visibility, etc.). Under such conditions, incorporating antithetic sampling techniques can lead to an increase in variance.

As such, the combined stratified importance sampling component 120 can employ a test to detect for this situation. More specifically, the combined stratified importance sampling component 120 can predict whether antithetic sampling will increase variance and can employ antithetic sampling techniques only upon determining that no increase in variance will occur. For instance, if $Cov(X,Y)=\sigma_{XY}$, then using the Delta method, it can be derived up to first order that $Cov(f(X),\ f(Y)) \approx_1 (f'(\mu))^2\ \sigma_{XY}$, where $\langle X \rangle = \langle Y \rangle = \mu$. When the function is linear, the negative correlation is preserved and its magnitude depends on the variance of the function. However, for non-linear functions, the following algorithm shown as Condition 1 can be derived for the negative correlation between X and Y to remain negative after the function is evaluated at these locations:

$$\sigma_{XY} < -\frac{f(\mu)f''(\mu)}{(f'(\mu))^2}$$

Condition 1—Negative Correlation for Non-linear Functions

As evidenced by Condition 1, it may be preferable to control the correlation between random variables for certain integrands. In one embodiment, the combined stratified importance sampling component 120 is configured to employ the use of Gaussian copulas to adaptively control the degree to which the samples are antithetic. For instance, consider the goal of generating two d-dimensional random variables $X_1$ and $X_2$ that form an antithetic pair where $X_i=(x_{i,1}, x_{i,2}, \ldots, x_{i,d})$, $1 \leq i \leq 2$. Here, the linear dependencies (i.e., correlations) between all components can be fully described using a $2d \times 2d$ correlation matrix $\Sigma$, which is symmetric and positive semi-definite by definition. To obtain a pair of $(X_1, X_2)$ of generalized antithetic variables, the combined stratified importance sampling component 120 can draw $[X_1 \ X_2]^T$ as a single sample from the 2d dimensional zero-mean Normal distribution, with $\Sigma$ as its covariance matrix.

Depending on the structure of the correlation matrix, three special classes of antithetic pairs can be defined. For example, if the correlation matrix $\Sigma = I_{2d \times 2d} + c$ where $c = -1/(4d^2 - 2d)$, all inter-dimensional correlations are equally and minimally negative while remains semi-definite. Thus, when $(X_1, X_2)$ is generated using such a structure, $(X_1, X_2)$ can be classified as a conservative multidimensional antithetic pair.

One downside to conservative multidimensional antithetic pairs is that the random variables $X_1$ and $X_2$ are not uniformly distributed in $[0, 1]^d$, and thus lead to biased integrators. As such, in one embodiment, the combined stratified importance sampling component 120 can ensure that each variable in the pair is uniformly distributed in $[0,1]^d$ by ensuring that two $d \times d$ blocks along the leading diagonal of are identity matrices. That is, $\Sigma = [I_{d \times d} C; C^T I_{d \times d}]$ where C is any matrix so long as $\Sigma$ remains positive semi-definite. Generally, such a pair can be referred to as a uniform multidimensional antithetic pair.

A special case of uniform antithetic pair occurs when C is a diagonal matrix. In this case, $\Sigma_{i,d+j} = \text{Corr}(x_{1,i}, x_{2,j})$ and $\Sigma_{i,i}=1$, $i,j \leq 2d$. If $\text{Corr}(x_{1,i}, x_{2,j})=1$ this is equivalent to generating the antithetic pair $(X_1, 1-X_1)$. Such a pair can be classified as a simple multidimensional antithetic pair, since there are no mutual correlations across dimensions. Additionally, since uniform antithetic pairs (and thus simple multidimensional antithetic pairs) do not alter the distribution of the individual multidimensional samples, they lead to unbiased estimators. However, the complex correlations between such pairs affect the variances of the estimators. Thus, the combined stratified importance sampling component 120 can employ such pairs when the correlations are negative and are preserved by evaluation of the integrand, thereby achieving a reduction in the variance.

As discussed above, the combined stratified importance sampling component 120 can be configured to evaluate a condition to determine whether antithetic importance sampling for a three-dimensional scene will result in a variance reduction. In one embodiment, the combined stratified importance sampling component 120 is configured to evaluate the following condition shown in Condition 2 for antithetic importance sampling to determine whether the sampling will result in a variance reduction.

$$\sigma_{XY} < -\frac{f(\mu)}{g(\mu)} \frac{f''(\mu)g(\mu) - f(\mu)g''(\mu)}{f'(\mu)g(\mu) - f(\mu)g'(\mu)} + 2g(\mu)g'(\mu)$$

Condition 2—Variance Reduction for Antithetic Importance Sampling

The Condition 2 can be derived by substituting $f_g(x)$ in place of $f(x)$ in Condition 1, treating $F_g$ as the integrand and deriving the variance of the antithetic importance sampled estimator as $V(\bar{\mu}_{ais,2}) = V(\bar{\mu}_{is,2}) + \text{Cov}(f_g(X), f_g(1-X))/2$. Generally, the combined stratified importance sampling component 120 can use the Conditions 1 and 2 to control the correlation between the random variables to obtain a variance reduction while using antithetic variates. That is, if the combined stratified importance sampling component 120 evaluates the Conditions 1 and 2 and the tests reveal an expected increase in variance, then the correlation between the samples may be set to zero, such that the combined stratified importance sampling component 120 will default to using a naïve Monte Carlo estimator (or jittered sampling) to collect samples from the three-dimensional scene.

Thus, in such an embodiment, the combined stratified importance sampling component 120 can use an antithetic sampling primary estimator that uses two samples, and its variance can be reduced due to negative correlation between the two samples. Additionally, the combined stratified importance sampling component 120 can use a corresponding secondary estimator whose variance is also lowered by a proportional factor, regardless of the number of primary estimates used. Doing so allows the combined stratified importance sampling component 120 to reduce the overall root mean squared error (RMSE), although the use of such antithetic sampling techniques may not (by itself) affect the convergence rate.

As such, the combined stratified importance sampling component 120 can combine stratified sampling techniques together with antithetic and importance sampling techniques, in order to affect the convergence rate and to further reduce error. As discussed above, stratified sampling is generally known to improve convergence. In one embodiment, the combined stratified importance sampling component 120 is configured to integrate jittered sampling (i.e., stratified sampling) together with importance sampling, where the domain is partitioned into N strata so that $\mathcal{D} = \cup \mathcal{D}_i$, $1 \leq i \leq N$ with $\mathcal{D}_i \cap \mathcal{D}_j = \emptyset$, $\forall i \neq j$ and proportional (i.e., equal) allocation.

Consider the case that a single sample is drawn from each stratum, $X_i \sim g(x)$, $x \in \mathcal{D}_i$, where g(x) is a probability density function defined on the entire domain D. Since the integral of the importance function $\beta i$ is potentially different over (unequal) strata, an additional factor of $\beta i$ is required to avoid bias. The resulting unbiased stratified importance sampling estimator is shown below in Equation 1:

$$\bar{\mu}_{sis,N} = \sum_{i=1}^{N} \beta i \frac{f(X_i)}{g(X_i)}, \text{ where } \beta i = \int_{D_i} g(x)dx.$$

Equation 1—Unbiased Stratified Importance Sampling Estimator

Generally, multi-dimensional jittered samples may be passed through inverse cumulative density functions of the importance function, such that $\beta=1/N$. In such a scenario, the variance of the resulting estimator $\bar{\mu}_{jis,N}$, where $I_i$ is the integral of f(x) within the domain $D_i$, is shown below in Equation 2.

$$V(\tilde{\mu}_{jis,N}) = \frac{1}{N^2} \sum_{i=1}^{N} \left( \int_{D_i} \frac{f^2(x)}{g(x)} dx - I_i^2 \right)$$

$$= \frac{V(\tilde{\mu}_{is,N})}{N} + \frac{\sum_{i=1}^{N} \sum_{j \neq i}^{N} I_i I_j}{N^2}$$

Equation 2—Variance of Resulting Estimator

Since $I = \Sigma I_i$, the upper bound for the variance can be represented as Condition 3, shown below.

$$V(\tilde{\mu}_{jis,N}) \leq \frac{V(\tilde{\mu}_{is,N})}{N} + \frac{N-1}{N^3} I^2.$$

Condition 3—Upper Bound of Variance

Generally, this upper bound is achieved when the integral over each of the strata is equal, and Condition 3 shows the combination of jittered sampling with importance sampling leads to improved convergence with error $O(N^{-1})$ instead of $O(N^{-1/2})$ achieved by importance sampling alone.

Similarly, by combining jittered sampling with multiple importance sampling, the combined stratified importance sampling component 120 can improve the convergence of the multiple importance sampling estimator from $O(N^{-1/2})$ to $O(N^{-1})$, at the cost of an additional error term. Equation 4, shown below, represents the variance of the stratified jittered multiple importance sampling estimator:

$$V(\tilde{\mu}_{jmis,N}) = \frac{N_g}{N} V(\tilde{\mu}_{avg,isN}) + \frac{N_g^2}{N^2} k$$

Equation 3—Variance of Stratified Jittered *MIS* Estimator

Furthermore, the error term is shown by Equation 4.

$$k = \left( \sum_{i=1}^{i<\frac{N}{N_g}} \sum_{j \neq i}^{j<\frac{N}{N_g}} \eta_{ij} + \sum_{i=1}^{i<N_g} \psi_i - \frac{N_g - 1}{N_g} I^2 \right)$$

Equation 4—Error Term of Stratified Jittered *MIS* Estimator Variance

As discussed above, antithetic sampling provides a zero-variance estimator for a linear integrand. In one embodiment, the combined stratified importance sampling component 120 is configured to combine stratification with antithetic sampling. By combining stratification with antithetic sampling, the combined stratified importance sampling component 120 produces an estimator whose only source of variance is in regions where the integrand varies sharply (i.e., regions with a high gradient). However, as discussed above, there are situations where antithetic sampling leads to an increase in variance. As such, the combined stratified importance sampling component 120 can be configured to evaluate the Condition 1 and if the condition is not satisfied, the combined stratified importance sampling component 120 can draw the antithetic sample as an uncorrelated sample. Doing so ensures that, in the worst case, the stratified antithetic sampling algorithm degenerates into a standard stratified sampling with respect to error.

Additionally, the combined stratified importance sampling component 120 can combine stratified sampling together with antithetic sampling and importance sampling techniques. Generally, stratified sampling provides a benefit when the integrand f(x) is piece-wise (within the strata) linear or skew-symmetric. Additionally, the inclusion of an importance function to generate the samples requires instead that $F_g(x)=f(x)/g(x)$ is piece-wise linear or skew-symmetric. Since importance functions are typically designed to warp the integrand to a constant, it can be expected that stratified antithetic importance sampling will, in general, have a low error. However, as discussed above, the combined stratified importance sampling component 120 can be configured to evaluate the Condition 2 to determine whether to maintain the correlation between the antithetic samples. If the combined stratified importance sampling component 120 determines that the condition is not satisfied, then the combined stratified importance sampling component 120 can eliminate the correlation between the antithetic samples so that the sampling approach degenerates to stratified sampling. Doing so enables the combined stratified importance sampling component 120 to take advantage of the generally reduced error resulting from stratified antithetic importance sampling, while avoiding situations where stratified antithetic importance sampling increases the resulting error.

Figure 5:
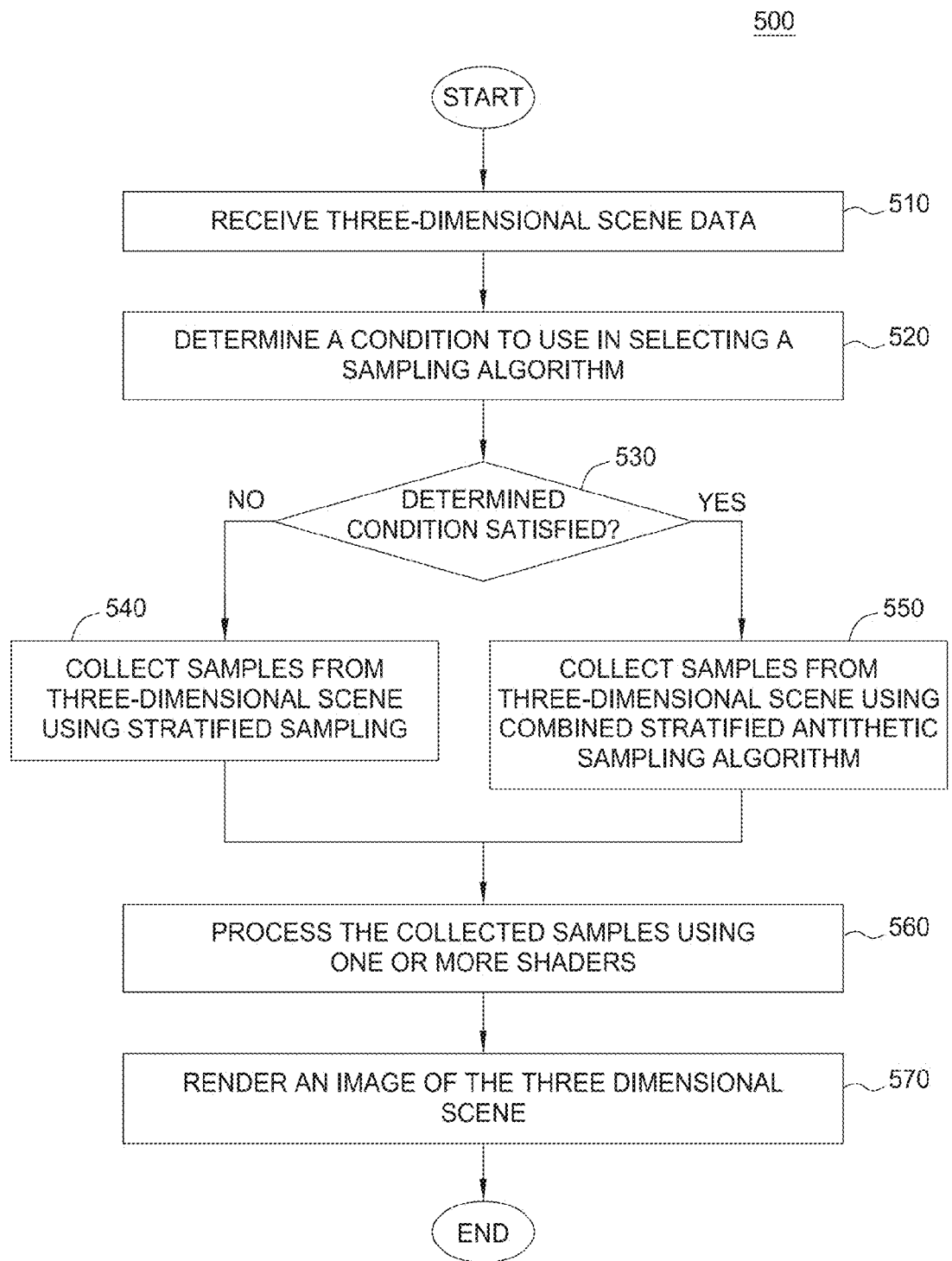
FIG. 5 is a flow diagram illustrating a method of rendering an image from a three-dimensional scene by selectively using one of multiple sampling algorithms, according to one embodiment described herein.

FIG. 5 is a flow diagram illustrating a method of rendering an image from a three-dimensional scene by selectively using one of multiple sampling algorithms, according to one embodiment described herein. As shown, the method 500 begins at block 510, where the combined stratified importance sampling component 120 receives three-dimensional scene data for use in rendering the image. The combined stratified importance sampling component 120 then determines a condition to use in selecting a sampling algorithm for use in collecting samples from the three-dimensional scene data (block 520). In the depicted example, the combined stratified importance sampling component 120 is configured to select between a stratified sampling algorithm and a combined stratified antithetic sampling algorithm for use in collecting samples. Accordingly, and as discussed above, the combined stratified importance sampling component 120 could determine that the Condition 1 should be evaluated. As another example, in an embodiment where the combined stratified importance sampling component 120 is configured to select between a stratified sampling algorithm and a combined stratified antithetic importance sampling algorithm, the combined stratified importance sampling component 120 could determine that the Condition 2 should be evaluated.

The combined stratified importance sampling component 120 then determines whether the condition is satisfied (block 530). For example, the combined stratified importance sampling component 120 could evaluate the Condition 1 discussed above and, upon determining the condition is not satisfied, could collect samples from the three-dimensional scene by drawing the antithetic sample as an uncorrelated sample, ensuring that the stratified antithetic sampling degenerates to stratified sampling (block 540). On the other hand, if the condition is determined to be satisfied, the combined stratified importance sampling component 120 could collect the samples using the combined stratified antithetic sampling algorithm (block 550). Additionally, although not shown, in another embodiment the combined stratified importance sampling component 120, upon determining the Condition 2 is satisfied, could collect the samples using stratified antithetic importance sampling (or multiple-importance sampling).

The combined stratified importance sampling component 120 then processes the collected samples using one or more shaders (block 560) to render the image of the three-dimensional scene (block 570), and the method 500 ends. Doing so enables the combined stratified importance sampling component 120 to reduce the error (i.e., undesirable visual noise) in the resulting rendered image through the use of stratified antithetic sampling. Moreover, the method 500 enables the combined stratified importance sampling component 120 to avoid the relatively rare situations in which stratified antithetic sampling would lead to an increase in error by ensuring the antithetic sample is drawn as an uncorrelated sample when the Condition 1 is not satisfied.

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the foregoing is directed to embodiments of the present invention, other and further embodiments of the invention may be devised without departing from the basic scope thereof, and the scope thereof is determined by the claims that follow.

What is claimed is:

1. A computer-implemented method of sampling visual characteristics of a three-dimensional scene, the computer-implemented method comprising:
   collecting a plurality of samples within the three-dimensional scene, comprising:
      evaluating a first condition to determine whether the first condition is satisfied, wherein the first condition is indicative of whether a combined stratified multiple-importance sampling algorithm will result in reduced error for a rendered image of the three-dimensional scene, wherein the combined stratified multiple-importance sampling algorithm has at least two importance functions and integrates an antithetic sampling algorithm;
      upon determining that the first condition is satisfied, collecting the plurality of samples using the combined stratified multiple-importance sampling algorithm; and
      otherwise, collecting the plurality of samples using a stratified sampling algorithm;
   simulating one or more lighting effects for the three-dimensional scene, based on at least: (i) the collected plurality of samples and (ii) data describing one or more light sources for the three-dimensional scene; and
   rendering the image by operation of one or more computer processors and based on at least: (i) the simulated one or more lighting effects and (ii) data describing characteristics of the three-dimensional scene.

2. The computer-implemented method of claim 1, wherein the plurality of samples is collected using the stratified sampling algorithm by:
   performing the combined stratified multiple-importance sampling algorithm together with the integrated antithetic sampling algorithm as an uncorrelated sample.

3. The computer-implemented method of claim 2, wherein each of the at least two importance functions corresponds to a respective strata.

4. The computer-implemented method of claim 3, wherein a first importance function of the at least two importance functions is at least one of: (i) a piece-wise linear integrand and (ii) a skew-symmetric integrand.

5. The computer-implemented method of claim 1, wherein each importance function of the combined stratified multiple-importance sampling algorithm corresponds to a respective strata, wherein a stratified multiple-importance sampling estimator for the combined stratified multiple-importance sampling algorithm comprises a sum of primary estimators for each of the strata.

6. The computer-implemented method of claim 1, wherein collecting the plurality of samples within the three-dimensional scene using the combined stratified multiple-importance sampling algorithm comprises:
   controlling a degree to which the plurality of samples are antithetic, using one or more Gaussian copulas.

7. The computer-implemented method of claim 6, further comprising:
   classifying each of a plurality of pairs of samples within the plurality of samples as one of: (i) a conservative multidimensional antithetic pair; (ii) a uniform multidimensional antithetic pair; and (iii) a simple multidimensional antithetic pair.

8. A non-transitory computer-readable medium containing computer program code that, when executed, performs an operation for sampling visual characteristics of a three-dimensional scene, the operation comprising:
   collecting a plurality of samples within the three-dimensional scene, comprising:
      evaluating a first condition to determine whether the first condition is satisfied, wherein the first condition is indicative of whether a combined stratified multiple-importance sampling algorithm will result in reduced error for a rendered image of the three-dimensional scene, wherein the combined stratified multiple-importance sampling algorithm has at least two importance functions and integrates an antithetic sampling algorithm;
      upon determining that the first condition is satisfied, collecting the plurality of samples using the combined stratified multiple-importance sampling algorithm; and
      otherwise, collecting the plurality of samples using a stratified sampling algorithm;
   simulating one or more lighting effects for the three-dimensional scene, based on at least: (i) the collected plurality of samples and (ii) data describing one or more light sources for the three-dimensional scene; and
   rendering the image by operation of one or more computer processors when executing the computer program code, and based on at least: (i) the simulated one or more lighting effects and (ii) data describing characteristics of the three-dimensional scene.

9. The non-transitory computer-readable medium of claim 8, wherein the plurality of samples is collected using the stratified sampling algorithm by:
   performing the combined stratified multiple-importance sampling algorithm together with the integrated antithetic sampling algorithm as an uncorrelated sample.

10. The non-transitory computer-readable medium of claim 9, wherein each of the at least two importance functions corresponds to a respective strata.

11. The non-transitory computer-readable medium of claim 10, wherein a first importance function of the at least two importance functions is at least one of: (i) a piece-wise linear integrand and (ii) a skew-symmetric integrand.

12. The non-transitory computer-readable medium of claim 8, wherein each importance function of the combined stratified multiple-importance sampling algorithm corresponds to a respective strata, wherein a stratified multiple-importance sampling estimator for the combined stratified multiple-importance sampling algorithm comprises a sum of primary estimators for each of the strata.

13. The non-transitory computer-readable medium of claim 8, wherein collecting the plurality of samples within the three-dimensional scene using the combined stratified multiple-importance sampling algorithm comprises:
   controlling a degree to which the plurality of samples are antithetic, using one or more Gaussian copulas.

14. The non-transitory computer-readable medium of claim 13, the operation further comprising:
   classifying each of a plurality of pairs of samples within the plurality of samples as one of: (i) a conservative multidimensional antithetic pair; (ii) a uniform multidimensional antithetic pair; and (iii) a simple multidimensional antithetic pair.

15. A system to sample visual characteristics of a three-dimensional scene, the system comprising:
   a processor; and
   a memory containing computer program code that, when executed by the processor, performs an operation comprising:

collecting a plurality of samples within the three-dimensional scene, comprising:
  evaluating a first condition to determine whether the first condition is satisfied, wherein the first condition is indicative of whether a combined stratified multiple-importance sampling algorithm will result in reduced error for a rendered image of the three-dimensional scene, wherein the combined stratified multiple-importance sampling algorithm has at least two importance functions and integrates an antithetic sampling algorithm;
  upon determining that the first condition is satisfied, collecting the plurality of samples using the combined stratified multiple-importance sampling algorithm; and
  otherwise, collecting the plurality of samples using a stratified sampling algorithm;
simulating one or more lighting effects for the three-dimensional scene, based on at least: (i) the plurality of samples and (ii) data describing one or more light sources for the three-dimensional scene; and
rendering the image based on at least: (i) the simulated one or more lighting effects and (ii) data describing characteristics of the three-dimensional scene.

16. The system of claim 15, wherein each importance function of the combined stratified multiple-importance sampling algorithm corresponds to a respective strata, wherein a stratified multiple-importance sampling estimator for the combined stratified multiple-importance sampling algorithm comprises a sum of primary estimators for each of the strata.

17. The computer-implemented method of claim 1, wherein each of the at least two importance functions corresponds to a respective strata, wherein a first of the at least two importance functions is, in respective instances: (i) a piece-wise linear integrand and (ii) a skew-symmetric integrand; wherein the plurality of samples is collected using the stratified sampling algorithm by:
  performing the combined stratified multiple-importance sampling algorithm together with the integrated antithetic sampling algorithm as an uncorrelated sample;
  wherein a stratified multiple-importance sampling estimator for the combined stratified multiple-importance sampling algorithm comprises a sum of primary estimators for each of the strata;
  wherein collecting the plurality of samples within the three-dimensional scene using the combined stratified multiple-importance sampling algorithm comprises controlling a degree to which the plurality of samples are antithetic, using one or more Gaussian copulas, wherein the computer-implemented method further comprises:
classifying each of a plurality of pairs of samples within the plurality of samples as, in respective instances: (i) a conservative multidimensional antithetic pair; (ii) a uniform multidimensional antithetic pair; and (iii) a simple multidimensional antithetic pair.

18. A computer-implemented method of sampling visual characteristics of a three-dimensional scene, the computer-implemented method comprising:
  collecting a plurality of samples within the three-dimensional scene, comprising:
    upon determining that a combined stratified importance sampling algorithm will result in reduced error for a rendered image of the three-dimensional scene, collecting the plurality of samples using the combined stratified importance sampling algorithm, wherein the combined stratified importance sampling algorithm integrates an antithetic sampling algorithm, wherein collecting the plurality of samples includes controlling, using one or more copulas, a degree to which the plurality of samples are antithetic; and
    otherwise, collecting the plurality of samples using a stratified sampling algorithm;
  classifying each of a plurality of pairs of samples within the collected plurality of samples as one of: (i) a conservative multidimensional antithetic pair; (ii) a uniform multidimensional antithetic pair; and (iii) a simple multidimensional antithetic pair;
  simulating one or more lighting effects for the three-dimensional scene, based on at least: (i) the collected plurality of samples and (ii) data describing one or more light sources for the three-dimensional scene; and
  rendering the image by operation of one or more computer processors and based on at least: (i) the simulated one or more lighting effects and (ii) data describing characteristics of the three-dimensional scene.

19. A non-transitory computer-readable medium containing computer program code that, when executed, performs an operation for sampling visual characteristics of a three-dimensional scene, the operation comprising:
  collecting a plurality of samples within the three-dimensional scene, comprising:
    upon determining that a combined stratified importance sampling algorithm will result in reduced error for a rendered image of the three-dimensional scene, collecting the plurality of samples using the combined stratified importance sampling algorithm, wherein the combined stratified importance sampling algorithm integrates an antithetic sampling algorithm, wherein collecting the plurality of samples includes controlling, using one or more copulas, a degree to which the plurality of samples are antithetic; and
    otherwise, collecting the plurality of samples using a stratified sampling algorithm;
  classifying each of a plurality of pairs of samples within the collected plurality of samples as one of: (i) a conservative multidimensional antithetic pair; (ii) a uniform multidimensional antithetic pair; and (iii) a simple multidimensional antithetic pair;
  simulating one or more lighting effects for the three-dimensional scene, based on at least: (i) the collected plurality of samples and (ii) data describing one or more light sources for the three-dimensional scene; and
  rendering the image by operation of one or more computer processors when executing the computer program code, and based on at least: (i) the simulated one or more lighting effects and (ii) data describing characteristics of the three-dimensional scene.

20. A system to sample visual characteristics of a three-dimensional scene, the system comprising:
  a processor; and
  a memory containing computer program code that, when executed by the processor, performs an operation comprising:
    collecting a plurality of samples within the three-dimensional scene, comprising:
      upon determining that a combined stratified importance sampling algorithm will result in reduced error for a rendered image of the three-dimensional scene, collecting the plurality of samples using the combined stratified importance sampling algorithm, wherein the combined stratified importance sampling algorithm integrates an antithetic sampling algorithm, wherein collecting the plurality of samples includes controlling, using one or more copulas, a degree to which the plurality of samples are antithetic; and otherwise, collecting the plurality of samples using a stratified sampling algorithm;

classifying each of a plurality of pairs of samples within the collected plurality of samples as one of: (i) a conservative multidimensional antithetic pair; (ii) a uniform multidimensional antithetic pair; and (iii) a simple multidimensional antithetic pair;

simulating one or more lighting effects for the three-dimensional scene, based on at least: (i) the plurality of samples and (ii) data describing one or more light sources for the three-dimensional scene; and rendering the image based on at least: (i) the simulated one or more lighting effects and (ii) data describing characteristics of the three-dimensional scene.

* * * * *